Patented Mar. 5, 1935

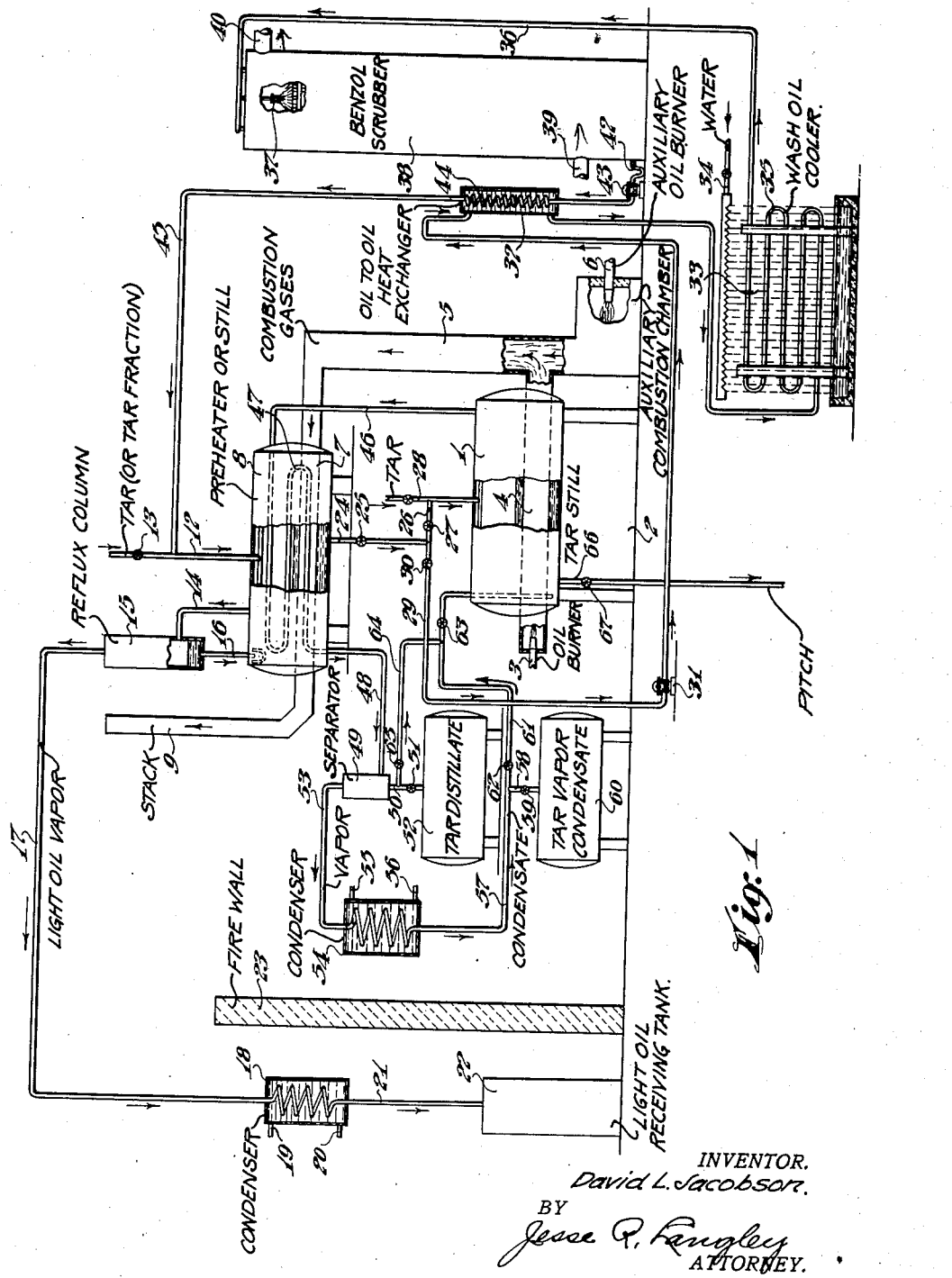

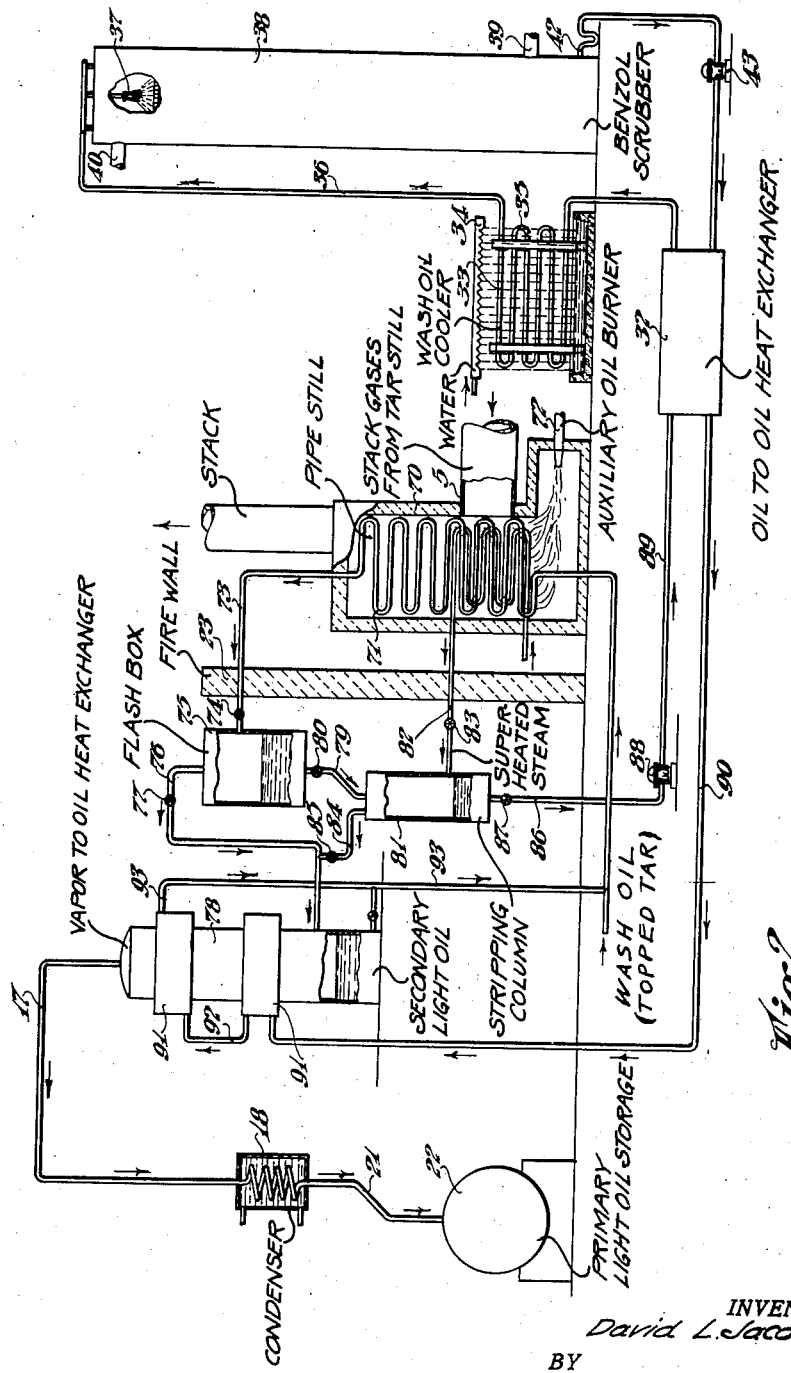

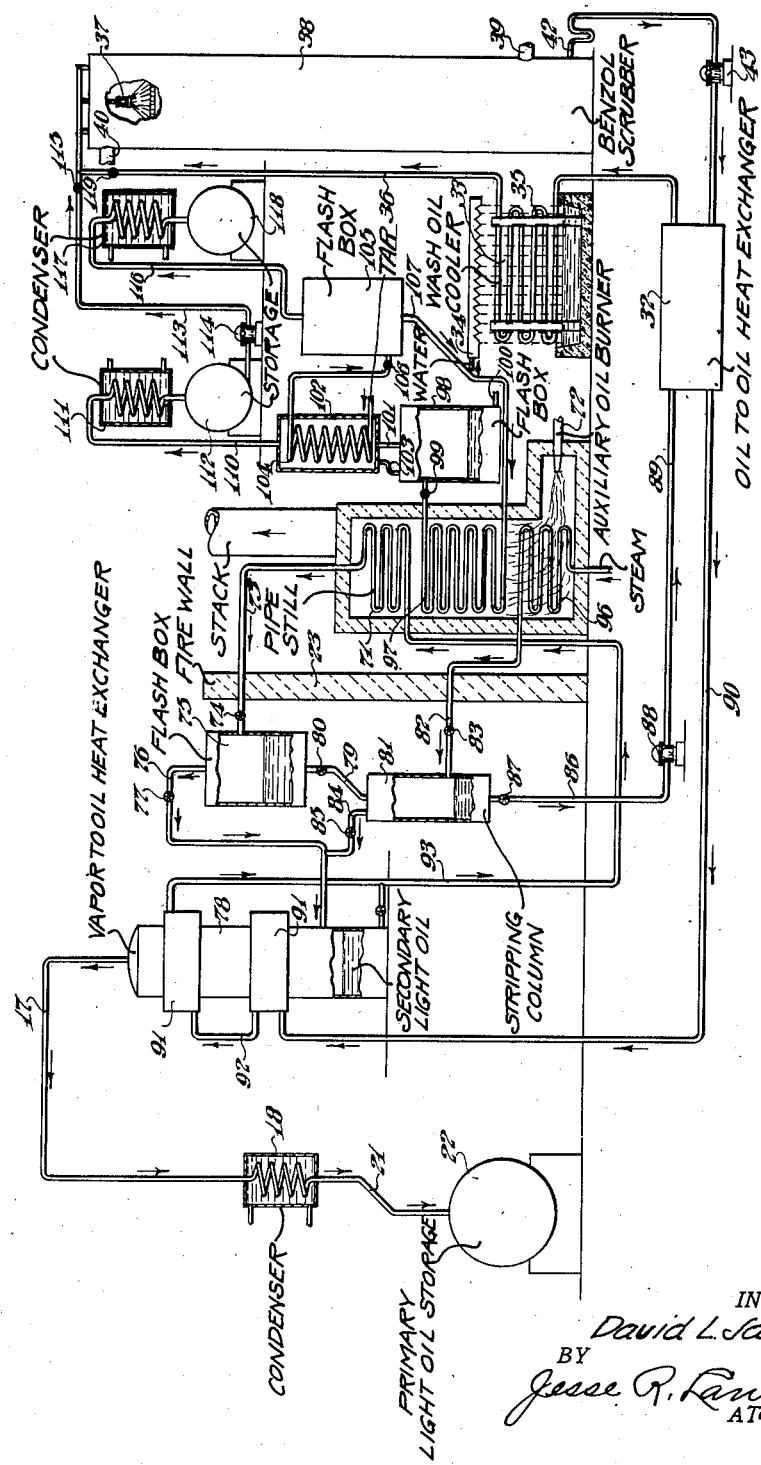

1,993,344

UNITED STATES PATENT OFFICE 1,993,344

LIGHT OIL REMOVAL

David L. Jacobson, Pittsburgh, Pa., assignor to The Koppers Company of Delaware, a corporation of Delaware Application August 5, 1931, Serial No. 555,220

9 Claims. (Cl. 196—76)

This invention relates to removal and recovery of light oil from gas produced by coal distillation, and more particularly to such recovery by distillation of wash oil used in scrubbing the gas, in conjunction with the distillation of tar condensed from the gas.

The light oil referred to above is such as may be separated by fractional distillation and condensation into forerunnings, benzol, toluol, xylol and residual constituents. The tar distillation referred to is for the production of creosote oil, pitch, etc., and is ordinarily an entirely separate process from the light oil recovery.

It is an object of the present invention to combine the light oil recovery with the distillation of tar, whether by obtaining a common distillate, effecting the distillation by common apparatus, or by a common source of heat, whereby various economies and other advantages are obtained.

Other objects and features of novelty will be apparent as the following description proceeds, reference being had to the accompanying drawings, in which Figure 1 is a diagrammatic illustration of a preferred embodiment of apparatus whereby the light oil removal and tar distillation according to the present invention may be practiced;

Fig. 2 is a similar view of modified apparatus for the performance of a modified process; and Fig. 3 is a similar view of further modified apparatus adapted for the practice of a further modified process.

Referring more particularly to the drawings, the apparatus shown in Fig. 1 comprises a tar still 1 mounted in a still setting 2 and supplied with heat by means of an oil burner 3. In the form shown, a heating flue 4 passes through the still 1 and communicates with an exhaust flue 5. The still setting 2 includes an auxiliary burner 6 whereby additional heated gases may be supplied to the exhaust flue 5.

The exhaust flue 5 is connected to a heating flue 7 which passes through a preheater or stripping still 8. The flue 7 is connected to a stack 9 whereby waste gases of combustion are exhausted to the atmosphere.

The preheater or still 8 is provided with a tar inlet pipe 12 controlled by a valve 13 and a vapor offtake 14 which is connected to a reflux column 15. A reflux return line 16 discharges into the preheater or still 8. The upper portion of the reflux column is connected by a light oil vapor line 17 with a condenser 18 which is supplied with cooling water by pipes 19 and 20. From the condenser 18 a condensate line 21 leads to a light oil receiving tank 22. The condenser 18 and tank 22 are protected from the heat of the tar still by a fire wall 23.

The preheater 8 is provided with a residue drawoff line 24 which is controlled by a valve 25. The line 24 is connected to two branches; one branch 26 controlled by a valve 27 is connected to an inlet line 28 for the still 1, while the other branch 29 controlled by a valve 30 is connected to a pump 31 whereby the liquid in the line is passed to an oil-to-oil heat exchanger 32.

The cool oil chamber of the heat exchanger 32 is connected to a wash oil cooler 33 which is supplied with water by a pipe 34 from which the cooling water is sprayed over the wash oil cooler coil 35. This coil is connected by a line 36 to a spray head 37 mounted inside a benzol scrubber 38 to which gas containing light oil is supplied by a pipe 39 and from which light oil free gas is exhausted through a pipe 40.

The wash oil sprayed by the sprinkler head 37 over the packing in the scrubber tower descends to the bottom thereof and is withdrawn by a line 42 provided with a pump 43 and passed through a coil 44 in the heat exchanger 32. From the coil 44 a line 45 is connected to the tar inlet pipe 12 for the preheater 8.

The tar still 1 is provided with a vapor offtake line 46 connected to a coil 47 within the preheater 8. From the coil 47 a line 48 connects to a separator 49. The lower portion of the separator 49 is connected by a line 50 controlled by a valve 51 to a tar distillate tank 52. The upper portion of the separator 49 is connected by a line 53 to a condenser 54 which is supplied with cooling water by pipes 55 and 56.

From the condenser 54 a condensate line 57 is connected by a line 58 controlled by a valve 59 with a tar vapor condensate tank 60. The line 57 is continued as a line 61 controlled by valves 62 and 63 which discharges into the bottom of the tar still 1. The line 50 above the valve 51 is connected by a pipe 64 controlled by a valve 65 with an intermediate portion of the line 61 ahead of the valve 63. The tar still 1 is provided with a residue drawoff line 66 controlled by a valve 67, through which pitch may be withdrawn from the still 1.

In operation of the apparatus shown in Fig. 1 according to the preferred embodiment of the novel process, the valve 13 is opened, and tar or a suitable tar fraction is charged into the preheater or still 8 through the charging line 12. If the process is practiced in conjunction with a coke oven producing 10 gallons of tar per ton of coal carbonized, this tar production is charged to the preheater or still 8.

The heat supplied by the heating flue 7 is sufficient to vaporize light oil and water from the tar, and the vapors are taken off by the line 14 and pass to the reflux column 15. The uncondensed vapors pass through the line 17 to the condenser 18 wherein they are condensed and the condensate passes through the line 21 to the light oil receiving tank 22. The reflux condensate formed in the column 14 is returned through the line 16 to preheater 8. The dehydrated and debenzolized tar is withdrawn through the line 24.

When the valve 25 is opened, the stream of tar from the preheater 8 through the line 24 is split, a small portion thereof passing through the line 26, the valve 27 being opened as desired, and through the line 28 into the tar still 1. A larger portion passes through the line 29, when the valve 30 is opened as desired, and is forced by the pump 31 through a chamber in the heat exchanger 32, which tends to cool the topped tar by virtue of the cooler liquid in the coil 44. From the heat exchanger 32 the topped tar passes to the coil 35 in the wash oil cooler 33 and is cooled by the water discharged thereover by the pipe 34.

The cooled topped tar from the cooler 33 passes through the line 36 to the spray head 37 in the benzol scrubber tower 38 and is sprayed over the packing therein. The gas which passes in through the pipe 39 and is exhausted through the pipe 40 ascends counterflow to the liquid which is descending in the tower. In this manner the gas is scrubbed of its light oil content and the tar is enriched thereby.

The light oil enriched tar is withdrawn through the line 42 and pumped by the pump 43 through the coil 44 in the oil-to-oil heat exchanger. The enriched tar is thus preheated and from this step the preheated light oil enriched tar passes through the line 45 to the line 12 for charging into the stripping still 8.

In the stripping still 8 the tar is dehydrated and stripped of its light oil content, the light oil and water vapors passing out through the offtake 14 as hereinbefore described. The stripped tar is withdrawn by the pipe 24 through the valve 25, and line 29 through the valve 30, and is returned to the scrubber 38 to complete a continuous cycle.

When the valves 25 and 27 are opened as desired, a portion of the tar from the pipe 24 is charged through the lines 26 and 28 into the tar still 1. The heat supplied by the heating flue 4 is sufficient to vaporize creosote oil from the pitch in the tar still. The creosote oil vapors are passed by the line 46 through the coil 47 in the preheater 8. This step tends to heat the tar in the preheater and to cool the vapors in the coil 47 whereby certain constituents thereof are condensed.

The vapors and condensate both pass through the line 48 to the separator 49, wherein the condensate collects as a pool, with the vapors in the space thereabove. The condensate passes down through the pipe 50 and valve 51 to the tank 52. The vapors pass upwardly through the line 53 to the condenser 54, the condensate therefrom passing through the lines 57, 58 and valve 59 to the tar vapor condensate tank 60.

If desired, distillate from the separator may be returned by the line 64 to the tar still 1, the valve 51 being closed and the valves 63 and 65 being opened for this purpose. Alternately if desired tar vapor condensate may be similarly returned by the line 61 to the still 1, the valves 59 and 65 being closed and valves 62 and 63 opened. Of course, with valves 51 and 59 closed, and valves 62, 63 and 65 opened, both distillate and condensate may be returned at the same time.

In the still 1, the topped tar is distilled to creosote oil and pitch, the creosote oil passing overhead as vapors, which are taken off through the line 46 as described, and the pitch remaining as a residue which may be withdrawn through the line 66 and valve 67.

A sample run of the apparatus described above is set forth as follows in conjunction with a coke oven producing 10 gallons of tar per ton of coal carbonized. It is calculated that 100 to 125 gallons of tar distillate per ton of coal is required to be circulated for efficient removal of light oil.

Under these conditions, 10 gallons of tar per ton of coal carbonized is added from the tar storage tank to the preheater 8. All of the light oil and water pass over as vapors, and 110 gallons of debenzolized tar are discharged therefrom through the line 24. Of this, 10 gallons passes through the lines 26 and 28 to the still 1 for distillation to creosote oil and pitch.

The remaining 100 gallons are recirculated through the line 29, pump 31, heat exchanger 32, cooler 33, scrubber 38, and lines 45 and 12 back to the preheater 8. This recirculation is substantially a closed cycle, except that light oil is taken up from the gas in the scrubber 38 and distilled off in the preheater 8.

A modified apparatus is shown in Fig. 2. In this view stack gases from a tar still are supplied to a pipe still 70 by the flue 5. The pipe still 70 comprises a coil 71 which is heated by the gases from the flue 5. If desired, an auxiliary oil burner 72 may be provided to further heat the coil 71.

From the coil 71 a line 73 controlled by a valve 74 passes the heated enriched wash oil to flash box 75, from which the flash distilled vapors go to a vapor-to-oil heat exchanger 78. The vapor line 17 passes from the heat exchanger 78 to the condenser 18.

The flash box 75 is provided with a liquid drawoff line 79 controlled by a valve 80. The line 79 is connected to a stripping column 81 supplied with superheated steam by a line 82 heated in the furnace setting of the pipe still 70, and controlled by a valve 83. A vapor line 84 from the stripping column and controlled by a valve 85 is connected to the vapor line 76 from the flash box 75.

The stripping column 81 is provided with a liquid drawoff line 86 controlled by a valve 87 and connected to a pump 88 from which a line 89 leads to the oil-to-oil heat exchanger 32. From the heat exchanger the liquid passes to the wash oil cooler 33. The other wash oil apparatus including the line 36, spray head 37, benzol scrubber 38, gas inlet 39, and outlet 40 are the same as described in connection with Fig. 1. The wash oil offtake 42 and pump 43 are also similar.

From the heat exchanger 32 in Fig. 2 a line 90 passes to the lower of a pair of drums 91 which are connected by a line 92, and form part of the heat exchanger 78. From the upper drum 91 a line 93 passes to the coil 71 of the pipe still.

In operation of the apparatus shown in Fig. 2, the pipe still for light oil distillate is heated by hot stack gases from a tar still producing tar products such as creosote oil, pitch, etc. The wash oil heated in the pipe still coil 71 passes to the flash box 75, the pressure being reduced by the valve 74. The water and light oil are vaporized and pass to the vapor-to-oil heat exchanger 78 wherein the secondary light oil is condensed, the primary light oil vapors passing through the line 17 to the condenser 18, the condensate passing through the line 21 to the primary light oil storage tank 22.

The residual wash oil from the flash box 75 is withdrawn by the line 79 through the valve 80 to the stripping column 81. The heat of the superheated steam from the pipe 82 through the valve 83 vaporizes the remainder of the light oil from the wash oil, the light oil vapors passing through the line 84 and valve 85 to the heat exchanger 78. The stripped wash oil is withdrawn by the pipe 86 through the valve 87 and forced by the pump 88 through the heat exchanger 32, wash oil cooler 33 and benzol scrubber 38 in the manner described in connection with Fig. 1.

The enriched wash oil from the heat exchanger 32 passes through the line 90 and is preheated in the drums 91 of the heat exchanger 78. The preheated enriched wash oil passes through the line 93 to the coil 71 of the pipe still for a cyclic repetition of the process.

The apparatus shown in Fig. 3 is largely a rearrangement of that shown in the preceding views, in combination with the following:

The pipe still which includes the coil 71 also includes a coil 96 for superheating the steam supplied to the pipe 82, and a coil 97 which discharges into a flash box 98 through a reducing valve 99. The flash box 98 has a residue drawoff line 100, a vapor offtake 101 connected to a reflux condenser 102 having a reflux return line 103 connected to the box 98. A coil 104 in the reflux condenser 102 discharges into a flash box 105 through a reducing valve 106. A residue drawoff line 107 from the flash box 105 is connected to the coil 97.

The reflux condenser 102 has a vapor offtake line 110 leading to a condenser 111 from which condensate passes to a storage tank 112. From this tank a line 113 provided with a pump 114 and a valve 115 is connected to the line 36. The flash box 105 has a vapor offtake line 116 leading to a condenser 117 from which condensate is collected in a tank 118. A valve 119 is provided in the line 36.

In operation, raw tar is charged to the coil 104 and is heated by the vapors in the reflux condenser 102 to such a temperature that upon reduction of pressure through the valve 106, the raw tar is dehydrated by flash distillation in the flash box 105. The water vapors and light oil vapors are drawn off through the line 116, condensed in the condenser 117 and collected in the tank 118.

The dehydrated tar passes from the box 105 through the line 107 to the coil 97, and is discharged through the valve 99 into the box 98 wherein creosote oil vapors are released, and from which a residue of soft pitch is drawn off through the line 100. The creosote oil vapors pass through the reflux condenser 102 and line 110 to the condenser 111 and are condensed and collected in the tank 112.

From the tank 112, creosote oil as required is pumped through the line 113 by the pump 114 into the line 36, to supply the wash oil for the light oil removal cycle. The valve 119 is preferably closed for this step. The creosote oil is sprayed into the scrubber 38 through the spray 37, and takes up light oil from the gas therein.

The light oil enriched creosote oil is withdrawn by the pump 43 through the line 42, and forced through the heat exchanger 32 into the line 90. This line conducts the enriched oil through the drums 91 of the vapor heat exchanger, from which the same passes through the line 93 to the furnace heating coil 71.

The heating coil 71 discharges through the pressure reducing valve 74 into the flash box 75, primary light oil flashing into vapors which are condensed in the condenser 18 and collected in the receiver 22. The residual oil passes through the line 79 and valve 80 to the stripping column 81, further vapors passing through the line 84 and valve 85 to combine with those from the flash box 75.

The stripping is effected by the superheated steam from the coil 96 discharged through the line 82 and valve 83 into the stripping column 81. The stripped creosote oil is withdrawn through the line 86 and valve 87 by the pump 88 and forced through the line 89, heat exchanger 32, cooler 33 and line 36 for recirculation.

The point at which the debenzolized tar or the wash oil is brought into contact with the gases for the removal of light oil may vary, but in general it is preferable to treat the gas when cold, that is in a coke oven plant either after the primary cooler or after the final cooler.

Instead of using a usual packed tower for removal of light oil from the gas, suitable sprays or atomizers may be used for spraying debenzolized tar or wash oil into contact with the cold gas. Several sprays may be arranged so that the gas is sprayed in series in countercurrent with the light oil absorbent.

In the apparatus shown in Fig. 1, various types of tar may be used. Instead of using tar from the plant tar storage tank, the fraction of tar condensing in the collecting main only may be used exclusively, or the fractions of tar condensing in the primary coolers or in the tar extractors may be used exclusively, or a thin tar from an outside source may be used in the system shown.

In the several forms described above, the combination process is highly economical inasmuch as light oil distillation is carried out by my waste heat. The amount of apparatus is reduced as compared with separate tar distillation and separate light oil distillation, thereby reducing the capital investment in plant required to effect both of these operations. Further economies are accomplished in the arrangement which provides a simpler way of supplying make-up wash oil from the tar distilling system into the system for washing light oil from the gas, and a simpler way of recovering the light oil from the spent or foul wash oil from the light oil gas washing system by the novel use of the tar distilling system for such light oil recovery system.

In the new process described above, steam consumption is reduced to an extremely low figure by the devices described. Inasmuch as steam represents the greatest cost in usual method of light oil distillation, the operating costs are reduced by the present invention, thereby effecting great savings.

While several embodiments of the invention have been illustrated and described in such detail as to enable anyone skilled in the art to practice the invention, nevertheless it will be understood that the invention is not to be limited to any of the details disclosed, other than as necessitated by the development of the prior art. Obviously, various changes may be resorted to with respect to the disclosed embodiments without departing from the spirit of the invention. It will therefore be appreciated that the invention embraces such embodiments of the broad idea as fall within the scope of the appended claims.

I claim as my invention:

1. The process of distilling tar and removing light oil from gas, which comprises distilling light oil from the tar, contacting a portion of the topped tar with gas to absorb light oil therefrom and returning said light oil enriched tar to the light oil tar distillation step to remove the absorbed light oil therein, distilling the other portion of the topped tar by indirect heat exchange with hot combustion gases to produce road tar, creosote oil, pitch, and effecting the light oil distillation with spent heat of the topped tar distillation operation.

2. A process of the character described, which comprises washing fuel gas with absorbent oil to absorb light oil therefrom, heating the enriched absorbent oil having light oil absorbed therein, to a temperature sufficient to vaporize light oil therefrom whereby the absorbent oil is stripped of its light oil content, taking off the light oil vapors and subjecting them to condensation, separately withdrawing the stripped absorbent oil; heating tar to a temperature sufficient to vaporize light constituents and then creosote oil therefrom, leaving a soft pitch, taking off the vapors and subjecting them to condensation, separately withdrawing the soft pitch, and effecting the aforesaid distillation of enriched absorbent oil by the heat of the waste combustion gases from the aforesaid heating tar step, the absorbent oil being a normally liquid fraction concurrently derived from the tar fed to the process.

3. A process of distilling tar and removing light oil from gas which comprises heating the tar to a temperature sufficient to vaporize light oil therefrom, leaving a topped tar, taking off the light oil vapors and subjecting them to condensation, separately withdrawing the topped tar and dividing it into two separate streams, contacting one of said streams with illuminating gas to absorb light oil therefrom, returning the light oil enriched tar to the vaporization step, heating the other portion of the topped tar to a temperature sufficient to vaporize creosote oil therefrom, leaving a residual pitch, taking off the creosote oil vapors and subjecting them to condensation, and separately withdrawing the residual pitch, and supplying the heat for the two vaporization steps from a single source or in a single furnace.

4. A gas and tar treatment process, comprising the steps of distilling creosote oil from the tar, scrubbing the light oil from the gas with said creosote oil, and distilling the light oil from the light oil enriched creosote oil by indirect heat exchange with the spent furnace gases from the tar distillation step.

5. A process for the combined removal of light oil from gas, and tar distillation, which comprises subjecting the tar to conditions of temperature and pressure effective to vaporize light oil therefrom, separately withdrawing the light oil vapors and unvaporized tar, dividing the stream of unvaporized tar, cooling only a divided portion of said unvaporized tar for subsequent light oil recovery from said gas and discharging the cooled portion into direct contact with gas, and thereby scrubbing the light oil from the gas so that the tar is enriched with light oil scrubbed from the gas, returning the light oil enriched tar to said light oil vaporization step; and subsequently distilling the uncooled portion of the topped tar to produce pitch and coal tar distillate of high boiling range.

6. A process for the combined removal of light oil from gas, and tar distillation, which comprises subjecting the tar to conditions of temperature and pressure effective to vaporize light oil therefrom, separately withdrawing the light oil vapors and unvaporized tar, dividing the stream of unvaporized tar, cooling a portion of said unvaporized tar and discharging the same into direct contact with gas, whereby the tar is enriched with light oil scrubbed from the gas, and returning the light oil enriched tar to said light oil vaporization step, subjecting another portion of the unvaporized tar withdrawn from said light oil vaporization step to conditions of temperature and pressure sufficient to evolve vapors therefrom, withdrawing from the process the unvaporized residue from said second vaporization step, taking off the vapors evolved by said second vaporization step and passing them in indirect heat interchange relation with the tar undergoing treatment in said first vaporization step.

7. A process for the combined removal of light oil from gas, and tar distillation, which comprises subjecting the tar to conditions of temperature and pressure sufficient to vaporize light oil, taking off the light oil vapors and condensing them as a product of the process, withdrawing the unvaporized tar, cooling only a portion of said unvaporized tar to condition it for subsequent light oil removal from said gas and scrubbing light oil from said gas therewith, returning the tar from said scrubbing step to said light oil vaporization step; and subsequently distilling the uncooled portion of the topped tar produce pitch and coal tar distillate of high boiling range.

8. A process for the combined removal of light oil from gas, and tar distillation, which comprises passing the charging tar for the process to a preheater wherein the tar is heated to a temperature sufficient to vaporize light oils and water, subjecting the vapors to reflux condensation, returning the reflux condensate to the preheater, and finally condensing as a product of the process the vapors uncondensed by the reflux condensation step, withdrawing the residual tar from said preheater, dividing the stream of residual tar, passing a portion of said residual tar to a still wherein the residual tar is heated to a temperature sufficient to vaporize the creosote oils, passing the vapors from said tar still through said preheater in indirect heat interchange relation with the charging tar therein, whereby part of the said vapors are condensed, separating the vapors from the liquid, collecting the liquid as a second product of the process, finally condensing said vapors, collecting the final condensate as a third product of the process, passing another portion of said residual tar through an oil-to-oil heat exchanger, and a wash oil cooler to a scrubber, passing gas into said scrubber, whereby said residual tar scrubs the gas, withdrawing said enriched residual tar from said scrubber, passing said residual tar through said oil-to-oil heat interchanger, whereby said tar is heated, and returning said heated tar to said preheater.

9. A gas treatment process which comprises discharging cool wash oil into direct contact with the gas, whereby the oil is enriched by light oil scrubbed from the gas, heating tar to distill the same by combustion gases, heating the enriched wash oil by indirect heat interchange with wash oil passing to said scrubber, further heating said enriched oil by indirect contact with vapors evolved from flush distillation of light oil in the process, passing the preheated enriched oil through a coil in a zone heated by spent hot heating gases from a tar still, and thereby heating the enriched oil to a temperature sufficient to cause flash distillation of certain of the light oil vapors upon subsequent reduction in pressure thereof, discharging the heated oil into a flash chamber under reduced pressure whereby light oil vapors are evolved, withdrawing the unvaporized wash oil and passing it to a stripping column, heating the wash oil therein by superheated steam whereby the remainder of the light oil is vaporized, combining the flash distilled and steam distilled vapors, partially condensing the combined vapors by said indirect contact with enriched wash oil, collecting the partial condensate, finally condensing the remaining combined light oil vapors and collecting the condensate, withdrawing the residual wash oil from said stripping column and cooling the same by said indirect contact with enriched wash oil from said scrubber, and subjecting said cooled wash oil to water cooling prior to discharge into said scrubber.

DAVID L. JACOBSON.